United States Patent [19]

Fernand

[11] Patent Number: 4,805,310
[45] Date of Patent: Feb. 21, 1989

[54] PROBE FOR THE MEASUREMENT OF DIMENSIONS

[75] Inventor: Beaumann Fernand, Le Locle, Switzerland

[73] Assignee: Dynafer SA, Switzerland

[21] Appl. No.: 93,362

[22] Filed: Sep. 4, 1987

[30] Foreign Application Priority Data

Sep. 11, 1986 [FR] France .................. 86 12832

[51] Int. Cl.$^4$ .............................. G01B 5/02
[52] U.S. Cl. ........................ 33/170; 33/147 E
[58] Field of Search ............ 33/170, 169 R, 147 E, 33/172 R

[56] References Cited

U.S. PATENT DOCUMENTS 1,488,818  4/1924  Johansson et al. ............ 33/147 E
1,671,737  5/1928  Norton ......................... 33/172 R

FOREIGN PATENT DOCUMENTS 863419   1/1953  Fed. Rep. of Germany .
2754223  6/1979  Fed. Rep. of Germany .
542231  12/1941  United Kingdom ............ 33/172 R Primary Examiner—Harry N. Haroian
Attorney, Agent, or Firm—Kevin McMahon

[57] ABSTRACT

Measuring apparatus is disclosed, in which a probe pin forms part of the measuring apparatus to allow the measurement of parts placed on a platform. The probe pin of the measuring apparatus may be retracted by a lever pivoting in a bracket fitted detachably to the housing of the apparatus. The retracting means fitted with this lever is easy to control and allows parts to be measured quickly.

3 Claims, 3 Drawing Sheets

PROBE FOR THE MEASUREMENT OF DIMENSIONS

TECHNICAL FIELD OF THE INVENTION

The present invention relates to measuring instruments, and is in particular concerned with a measurement probe capable of providing a signal corresponding to the dimension being measured, this signal then being fed to a counter which displays the dimension measured.

DESCRIPTION OF THE PRIOR ART

A probe of this type has already been proposed which comprises a housing containing a transducer system, for example an optical ruler, cooperating with an opto-electronic device which is capable of converting movement of the ruler into an electrical signal for using by the counter.

The optical ruler is connected to a probe pin mounted slidably in a housing so that when measurement is made, the pin is applied to the part to be measured which is placed against a reference stop located on the measuring instrument.

A probe pin is associated with resiliently biased thrust means disposed inside the housing and continually urging the pin towards its fully extended position. This thrust means may comprise a simple spring or may optionally take the form of a hydraulic or electrical thrust mechanism. Whatever the case, in order to effect measurement the probe pin should first be brought back into its retracted position to enable the part to be measured to be placed against the reference stop, and then released to allow its tip to come into contact with the part. This is why the probe includes means for retracting the probe pin, adapted to move the pin into the fully retracted position, against the force of the resilient thrust means.

A probe pin of the type described briefly above is available on the market, and a full description will be found in a booklet produced by the company Dr. Johannes Heidenhain, Postfash 1260, D-8225 Traunreut, Federal German Republic.

In this case the retracting means include a flexible cable which controls the retraction of the probe pin by a system similar to remote control systems of cameras. The manufacturer of this probe also proposes a pneumatically controlled automatic retraction means which enables the measuring procedure to be carried out automatically.

These two prior retraction means both suffer from the disadvantage that they are unsuitable for the high-speed hand measurements often called for in prototype workshops for instance, or required to check small production batches.

In GB patent specification No. 1 149 602 there is described a device for counting the number of documents, in a stack of documents. comprising a measuring probe which has a probe pin, slidably mounted in a probe housing between an unstable fully retracted position and a stable extended position. This rod is continuously urged towards the extended position by resilient biased retracting means, also located in the probe housing.

The counting device includes a base on which slides a bearing part by means of which a stack of sheets may be pressed against a support surface of the base. The support can be retracted by means of a mechanism comprising a lever connected to a handle. Furthermore the arm of the lever retracts the probe pin directly; the pin does not come into direct contact with the stack of sheets during counting. In other words the lever arm and the support serve to transmit to the probe pin the movement it has to make between the extended position and the position corresponding to the height of the stack of sheets. This known device is not able to measure mechanical parts to the degree of accuracy that the probe itself can achieve, since between the tip of the probe pin and the surface of the part to be measured (stack of sheets) there are several moving parts which inevitably introduce measuring errors well in excess of the tolerance levels with which a measuring probe of the type featured in the present application should operate.

It should also be noted that this mechanism makes the device complicated and consequently expensive.

BRIEF SUMARY OF THE INVENTION

It is an object of the instant invention to provide a measuring probe comprising simple and direct manual retraction means, with no part intervening between the probe pin and the part to be measured.

The present invention thus provides a measuring probe for measuring apparatus comprising a housing, a probe pin slidably mounted in the housing between an unstable fully retracted position and a stable extended position, towards which the pin is continually urged by resilient thrust means, comprising a pivoting member which is mechanically coupled on the one hand to a manually operated pivotally mounted drive member and, on the other hand, to the said probe pin, to enable the latter to be brought to its retracted position against the return force of the said resilient thrust means, wherein the said pivoting member and the said manually operated drive member are both mounted on the same pivoting axis on a support attached to the housing of the measuring probe, said pivoting member being connected directly to the resilient thrust means.

On account of these features, the pivoting member does not act directly on the probe pin, but on the probe's resilient thrust means, so that no errors in measurement are introduced. As the pivoting member and the drive member are mounted on the same axis, the resulting construction is very simple. Finally, since the support is located directly on the probe housing, the whole construction is compact, and readily adaptable for example to a measuring station in a prototype workshop.

According to a particularly advantageous feature of the invention, the support takes the form of a clamp which surrounds the probe housing and is easily separable therefrom.

The probe is therefore readily adaptable for use either with the retracting device or without it.

BRIEF DESCRIPTION OF THE DRAWINGS

The invention will be more readily understood with the aid of the following description of one embodiment thereof, this description being given by way of example only, with reference to the accompanying drawings wherein.

DETAILED DESCRIPTION OF THE INVENTION

Figure 1:
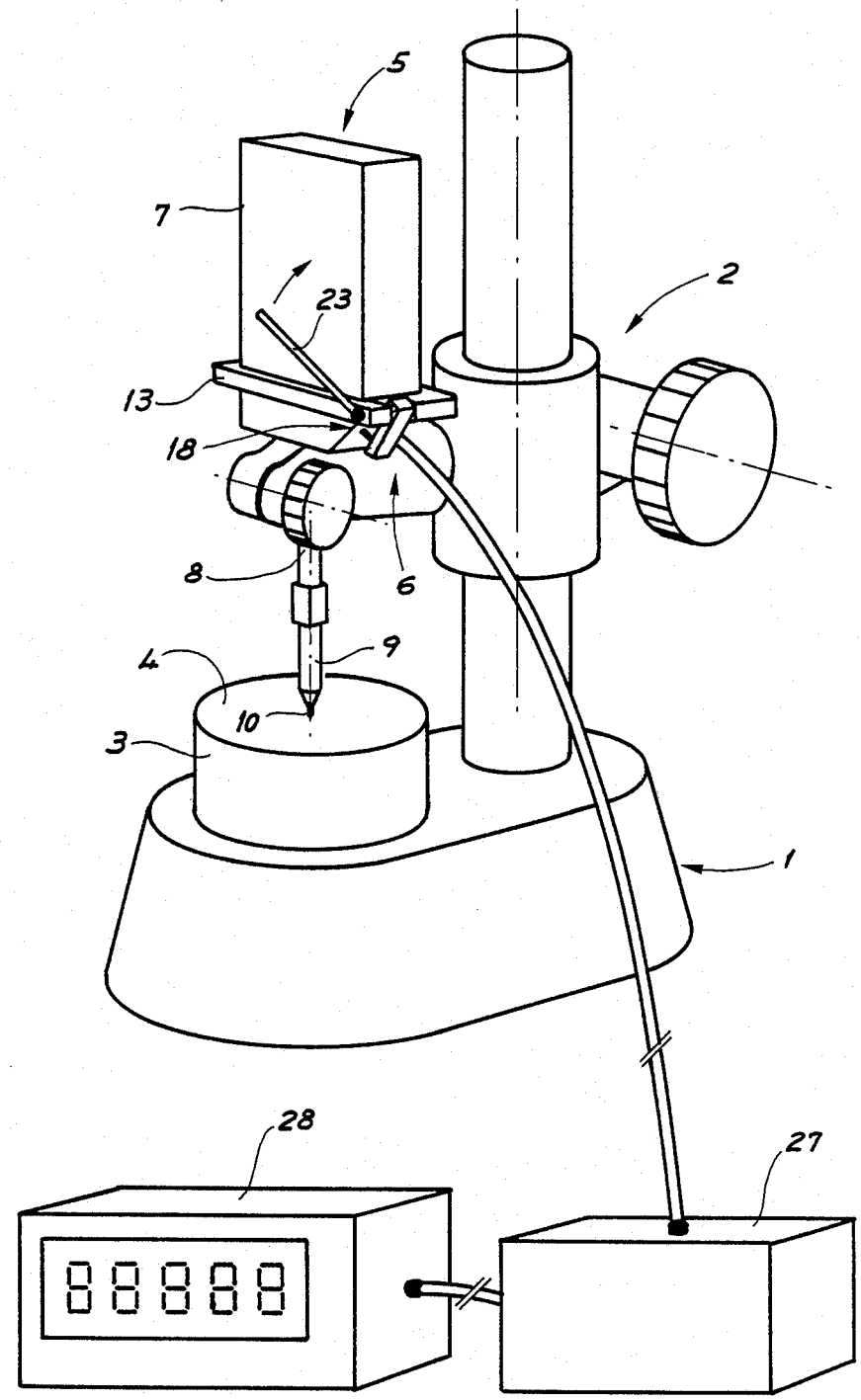
FIG. 1 is a perspective view of a measuring apparatus comprising a probe according to the invention.

FIG. 1 shows a general view of measuring apparatus fitted with a probe to which is connected retracting means according to the invention. A measuring support 1 has a height-adjustable bracket 2 and a platform 3, in this case formed by a circular platform, the upper face whereof constitutes a reference surface 4 for the measurement.

The bracket 2 supports a measurement probe 5 fitted with retracting means 6 according to the invention, which will now be described in detail with reference to FIGS. 2 to 4.

The measurement probe 5 may be one bearing the manufacturer's reference MT 10P/30P and marketed by the Company referred to above.

In a known manner this measurement probe comprises a housing 7 containing the transducer system (not shown) which, in the example described, is of the optical ruler type with opto-electronic sensor. A cylindrical tip 8 integral with the housing, projects from it and serves partly to guide the probe pin 9 and partly to fix the probe to the bracket 2.

The probe pin 9 is mounted slidably along its axis into the housing 7. At its free end it has a measuring member 10 which may take several forms as described in the leaflet of the Company referred to above. The probe pin is resiliently biased outwards and may be "take up" (i.e. partly retracted into the housing) to allow a dimension to be measured, e.g. the thickness of a part P (FIG. 2).

To this end, and still in a known manner, the housing 7 comprises a thread 11 into which, in a conventional manner, the connecting part of a remote control device or a pneumatic or electrical retracting device (not shown) is screwed. A device of this kind has a sliding pin bar 12, connected mechanically to the probe pin so that when the push bar is retracted, the probe pin is also withdrawn into the housing 7. The connecting mechanism is known per se, so no detailed description is given here.

According to the invention the retracting device 6 is constructed as follows:

A clamp 13, having two U-shaped sections 13a and 13b fixed together by screws 14, passes around the housing 7 of the measurement probe 5.

Figure 3:
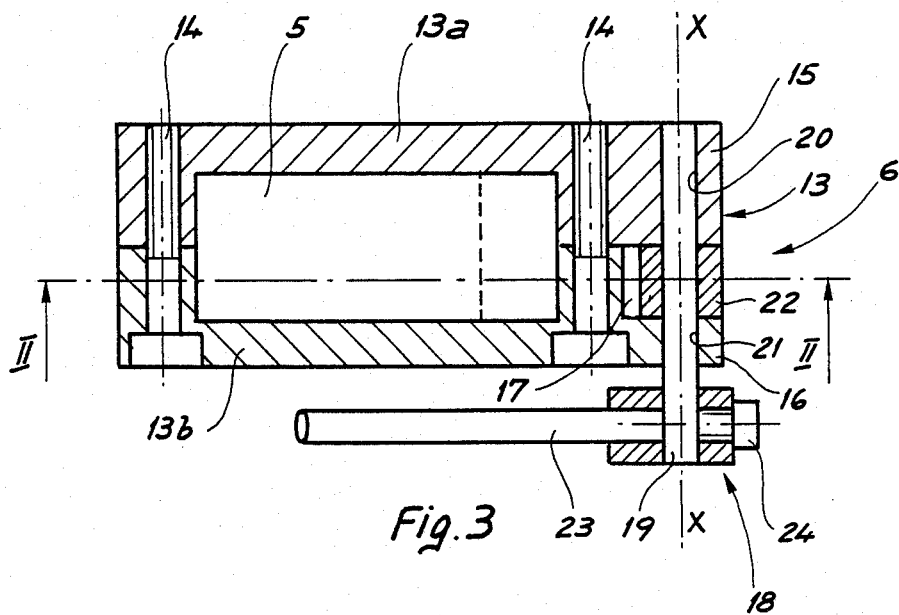
FIG. 3 is a sectional view along the line III—III of FIG. 2.
Figure 4:
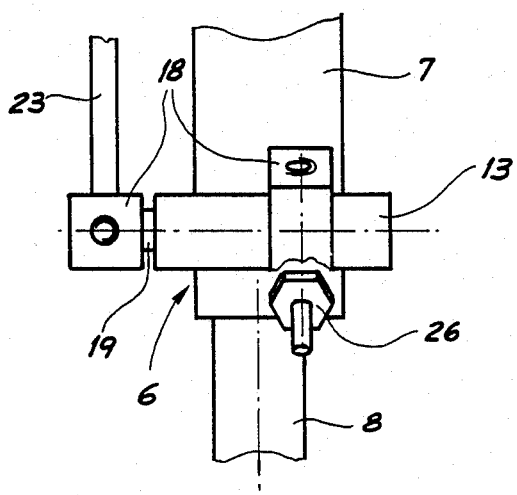
FIG. 4 is a partial side view of the probe pin and its retraction means.

On one side of this bracket 13, i.e. adjacent to one of the short sides of the housing 7, each of the two sections 13a or 13b of the bracket has an extension, 15 and 16 respectively, the extension 16 of the section 13b being cut away so as to form a cover 17 with the extension 15 of the other section 13a (FIG. 3).

A lever 18 is fitted rotatably into the bracket 13. This lever comprises a peg 19 rotatably mounted in holes 20 and 21, drilled respectively into the extensions 15 and 16 of the bracket 13. This peg 19 defines an axis of rotation X—X of the lever 18, an axis which in this example extends perpendicularly to the longer sides of the housing 7. The lever 18 also has two limbs 22 and 23, each extending perpendicularly to the axis X—X of the peg 19. The first limb 22 cooperates at its free end with the sliding push bar 12, whilst the other limb 23 is in the shape of a handle. The lever is fixed to the peg 19 by means of a screw 24, thereby allowing the angle of the handle 23 to be adjusted in relation to that of the limb 22.

Figure 2:
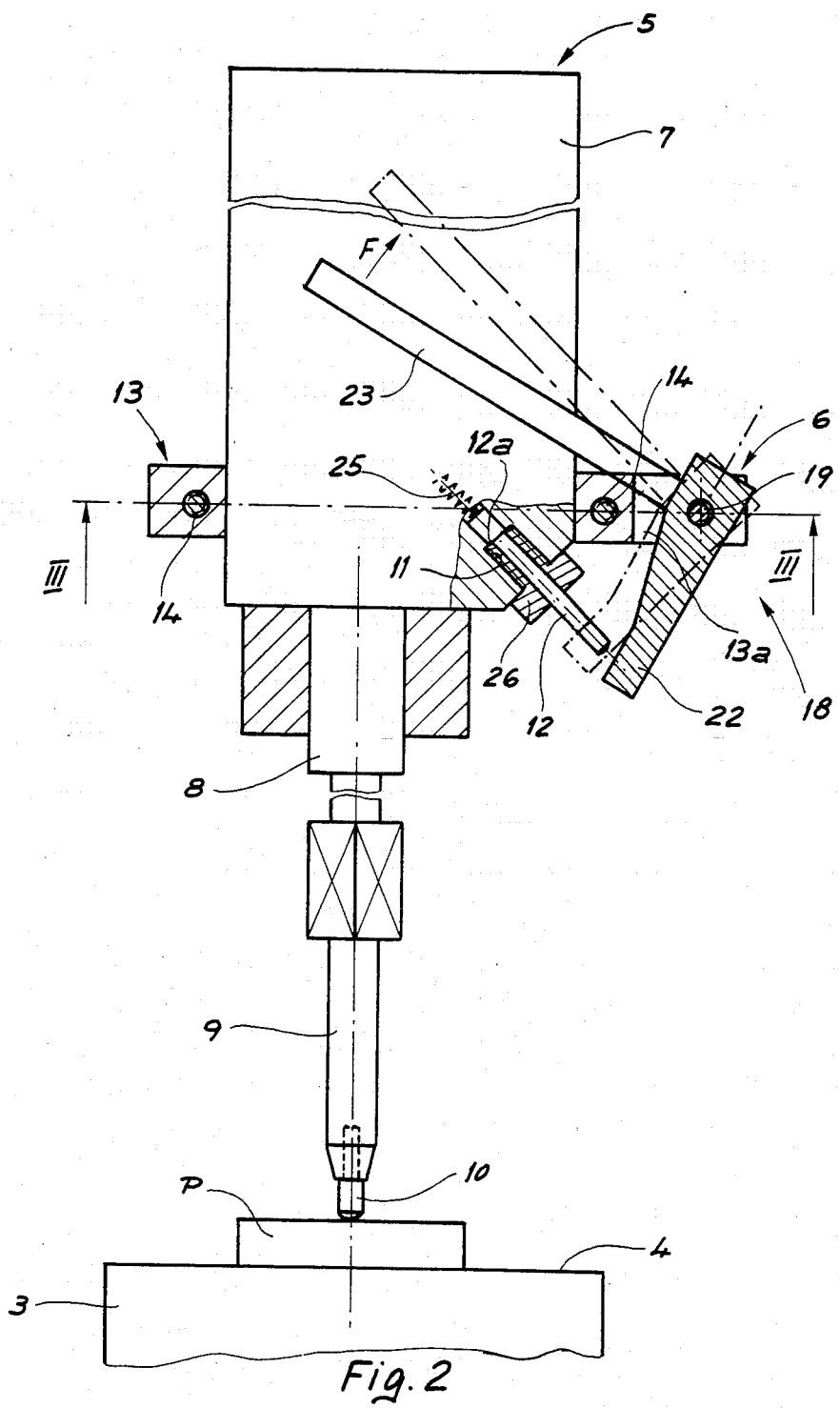
FIG. 2 is a partial sectional view on a larger scale of a probe according to the invention.

In FIG. 2 a spring 25 represents the resilient bias for the probe device. This device, besides urging the probe pin outwards, which is its main function, also urges the push bar 12 out of the housing 7, and is held in place by a radial shoulder 12a. This shoulder abuts with the back face of a nut 26, screwed into the thread 11, through which the push bar 12 passes.

The more the push bar 12 is retracted into the housing, the more the probe pin 9 is as well.

FIG. 1 shows that the measuring probe is connected to amplification and analysis equipment 27 which processes the electrical signal supplied by the transducer system (not shown) of the probe. The equipment 27 is connected to a display 28.

When the measuring instrument is not in use, its probe pin 9 may be completely extended, provided the surface 4 of the platform 3 is sufficiently far removed from the tip 10 of the pin. In order to calibrate the measuring instrument for a measurement, the bracket 2 fitted with the probe 5 is brought up to the surface 4 of the platform 3 so that the tip 10 touches it, and the amplifier/analyser 27 is adjusted so that the display registers zero.

In order subsequently to measure the thickness of the part P, the tip of the probe pin 9 is retracted by moving the handle 23 in the direction of the arrow F.

The part F is placed on the platform 3, and the handle is moved back gently until the tip 10 of the probe pin 9 rests on the part P. The thickness can then be read off on the display. The lever 18 is then in the position indicated by continuous lines in FIG. 2.

To remove the part P, the handle 23 is simply moved into the retracted position shown in FIG. 2, when the probe pin is fully withdrawn into its unstable retracted position. The lever 18 is again released; the probe pin 9 emerges completely from the equipment for a new measurement to be taken.

Moreover the invention may be used in measuring equipment other than that specifically herein described.

It will also be noted that the retracting device according to the invention is readily detachable. This means that the probe 5 can easily be used with standard retracting systems if desired, after the retracting device according to the invention has been removed.

The lever 18 may also be fitted with operating means other than the handle 23, e.g. a knurled button, screwed onto the clamp 9 in place of the handle 23.

It is therefore clear that the invention provides a simple and effective retracting device that can be operated in the immediate vicinity of the probe and the part for measurement.

Of course experts will be able to envisage many modifications of the invention.

In particular the apparatus according to the invention can be used with a measuring probe different from the one described above, but comprising a retracting system with a similar push bar, fitted in the same way into the probe housing.

What is claimed is:

1. A manually actuable control device for selectably retracting a measuring probe of a thickness measuring instrument having a measuring probe extending from a housing, said probe being resiliently urged outwardly from said housing towards a measuring plane along a first axis, comprising:

probe retraction control means extending from said housing and linearly actuable in a second axis offset from said first axis;

means for resiliently biasing said retraction control means outwardly from said housing;

a manually operable lever arm;

a bracket removably attached to said housing for pivotably mounting said lever arm about a third axis perpendicular to said second axis, said bracket including means for clamping said bracket to said housing;

an actuator mounted for rotation about said third axis in fixed relationship with and under the control of said lever arm, said third axis and said actuator being oriented such that rotation of said lever arm about such third axis in a first direction brings said actuator into contact with and depresses said retraction control means for raising said probe against bias away from said measuring plane and that rotation of said lever arm in the other direction permits said probe to advance under bias into contact with an object to be measured on said measuring plane.

2. A manually actuable controlled device according to claim 1 wherein said means for pivotally mounting said lever arm includes means for permitting angular adjustment of said lever arm with respect to said actuator.

3. A manually actuable controlled device in accordance with claim 1 wherein said bracket includes a pair of members encircling said housing for pivotably mounting said lever arm.

* * * * *